R. G. PINE.

Machine for Polishing Buckles.

No. 2,927. Reissued May 12, 1868.

INVENTOR
R. G. Pine
by his attorney
E. S. Renwick

WITNESSES
W. L. Bennem
Edw. R. Brevoort

N. PETERS, Photo-Lithographer, Washington, D. C.

United States Patent Office.

EMANUEL ANDREWS, OF WILLIAMSPORT, PENNSYLVANIA, ASSIGNEE OF ROBERT G. PINE.

*Letters Patent No.* 14,633, *dated April* 8, 1856; *reissue No.* 2,927, *dated May* 12, 1868.

IMPROVEMENT IN MACHINE FOR POLISHING BUCKLES.

The Schedule referred to in these Letters Patent and making part of the same.

TO ALL WHOM IT MAY CONCERN:

Be it known that I, ROBERT G. PINE, of Sing Sing, in the county of Westchester, and State of New York, have invented a new and improved Machine for Polishing Buckles and other articles constructed of metal; and I do hereby declare that the following is a full, clear, and exact description of the same.

The object of my invention is to remove the rough surface of buckles and other articles, and leave them smooth, or, in other words, to polish them with facility, and in such manner that each article, when finished, will be of uniform size. To this end my invention consists of certain combinations of the following instrumentalities, viz:

First, a revolving polisher or wheel, made of any material suitable for removing the surface of the article by a grinding-action.

Second, a holder, to hold the article firmly and present it to the revolving polishing-wheel.

Third, a shaft for the holder, so that the latter, while holding the article, is caused to turn on an axis past the revolving surface of the polishing-wheel.

Fourth, springs, whose operation is to bear the article against the polishing-wheel with a yielding pressure.

Fifth, a traversing-mechanism, for the purpose of causing the articles to move transversely along the rim of the wheel.

Sixth, guides or stops, which limit the distance to which articles can be moved towards the axis of the polishing-wheel, and thereby determine the amount of surface removed in the operation.

Seventh, a pattern or patterns, having faces of the same shape as the surface to which the article operated upon is to be reduced.

In order that my invention may be fully understood, I will proceed to describe a machine which embodies it, and is constructed to operate upon buckles, and will refer to the accompanying drawings, and to the letters of reference marked thereon—

Figure 2:
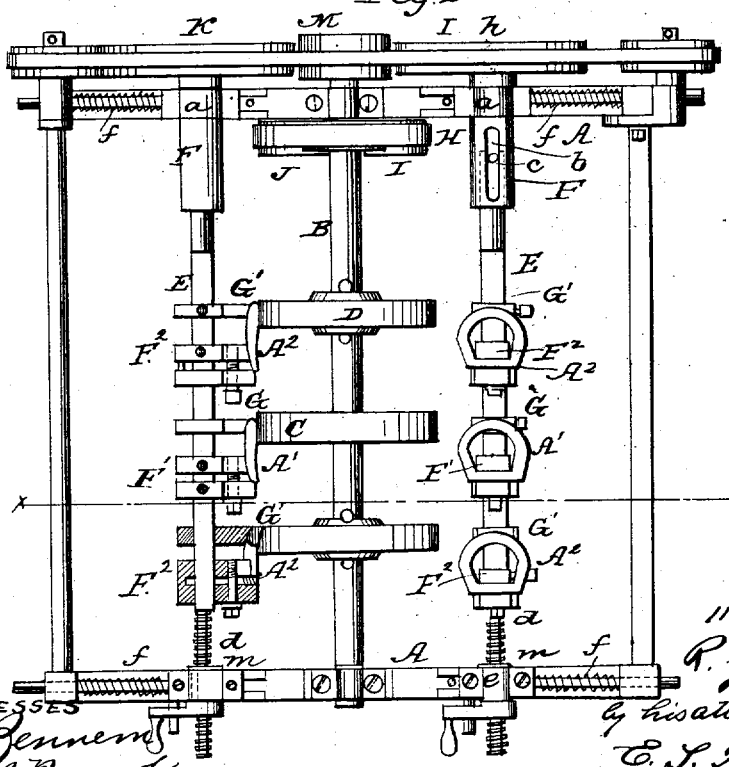

Figure 2 being a plan or top view of the machine, and

Figure 1:
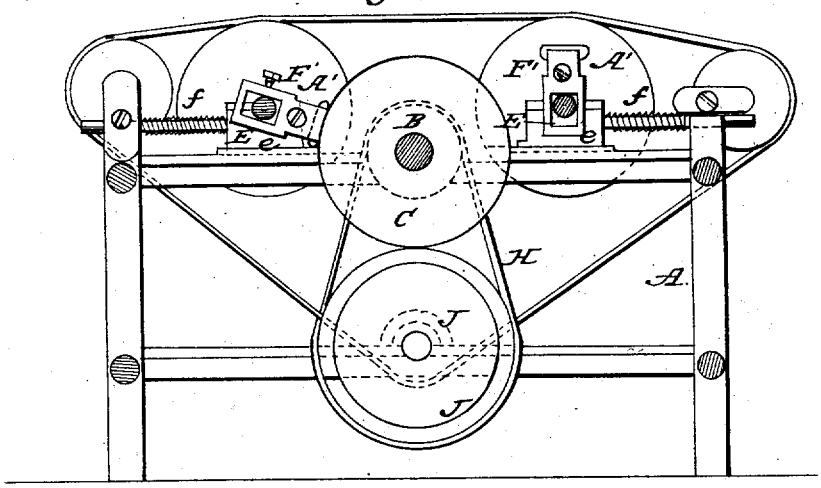

Figure 1 being a vertical transverse section of the same, at the line *x x* of fig. 2.

Similar letters indicate corresponding parts in the two figures.

This machine is constructed with duplicate holders, and the guides have the form of wheels, and are mounted upon the shaft of the polishing-wheel. A represents a rectangular framing, having a shaft, B, on its upper part, said shaft having a polishing-wheel, C, upon it, constructed in the usual or any proper way, and guide-wheels D D, which may be constructed of hard wood or metal. The guide-wheels are of the same diameter as the polishing-wheel, and the three wheels are placed at equal distances apart upon the shaft B.

E E are two shafts, which are placed, one at each side of the wheels C, D D. One end of each of these shafts fits in a socket, F F, which works in bearings *a a* at one side of the framing A. The sockets have each an oblong slot, *b*, made through them, and pins *c*, which pass transversely through the ends of the shafts, fit in these slots *b*. The opposite ends of the shafts E E have screw-threads *d d* cut on them, and the screw-threads work in internal threads cut in sleeves *m m*, that are supported in bearings *e e* on the framing A. The bearings *a a*, *e e* are allowed to slide on the framing A, and they have spiral springs, *f*, bearing against their outer sides.

On the shafts E E there are placed clamps $F^1$, between the ends of which one end of the buckles $A^1$, or other articles to be polished, are placed. Bars G are also placed on the shafts, which bars serve as rests for the opposite ends of the buckles or other articles. These clamps and bars are the holders of the articles. At each side of these holders are other holders, composed of clamps $F^2$ and bars G′, corresponding in positions with the guide-wheels D D, for the purpose of holding the patterns $A^2$, which should be finished buckles, or other articles of the form and size which the rough buckles or other articles are to have when polished. The shaft B is rotated by a belt, H, which passes around a pulley, I, on the shaft B, and also around a pulley, J, on a shaft, J′, at the lower part of the framing. The shafts E E have each a pulley, K, at one end, around which a belt, L, passes, said belt als passing around a pulley, M, on the shaft J′.

The operation is as follows: Motion is given the shaft J′ in any proper manner, and the shafts E E, B are rotated by their respective belts L H; the spiral springs *f* keeping the face of the buckles $A^1$ against the periphery of the polishing-wheel C, and the guide-wheels D D preventing the buckles from bearing too hard against the polishing-wheel. Were the guide-wheels not employed, the polishing-wheel would be liable to cut or wear off the sharp corners of the buckles. As the shafts E E rotate, they gradually move longitudinally in consequence of the screw-threads *d d* working in the threads in the sleeves of the bearings *e e*, and consequently the whole outer or face sides of the buckles A will be moved transversely past the edge of the wheel C, and polished. It will be understood that the articles being polished must be all of the same form, that is, those that are polished at the same time, in order that the articles which bear against the guide-wheels may cause the article which bears against the polishing-wheel to be properly presented to it.

Any proper number of polishing and guide-wheels may be employed, and the shafts E E may be of such a length that a large number of articles may be polished at the same time. When the articles are polished, the shafts E E are moved back by means of a crank.

The above machine will polish rapidly and well, and is therefore a labor-saving machine. It will be extremely valuable in manufactories, where many articles are now polished by hand, or by the slow process of an ordinary polishing-wheel.

Having thus described my invention, what I claim as new, and desire to secure by Letters Patent, is—

1. The combination of the following instrumentalities, viz, the revolving polishing-wheel, holder for the article, shaft for said holder, and springs to bear the article against the revolving wheel with a yielding pressure, substantially as before set forth.

2. I also claim the combination of the following instrumentalities, viz, the revolving polishing-wheel, holder for the article, shaft for the holder, springs to exert a yielding pressure, and guides to limit the movement of the article under the yielding pressure, substantially as before set forth.

3. I also claim the combination of the following instrumentalities, viz, the revolving polishing-wheel, holder for the article, shaft for the holder, springs to exert a yielding pressure, and transversing-mechanism, to move the article transversely to the rim of the wheel, substantially as before set forth.

4. I also claim the combination of the following instrumentalities, viz, the revolving polishing-wheel, holder for the article, guide to limit the movement of the article towards the polishing-wheel, and pattern for the article, substantially as before set forth.

5. I also claim the combination of the following instrumentalities, viz, the revolving polishing-wheel, holder for the article, shaft for the holder, guide to limit the movement of the article towards the polishing-wheel, and pattern for the article, substantially as before set forth.

6. I also claim the combination of the following instrumentalities, viz, the revolving polishing-wheel, holder for the article, shaft for the holder, springs, guide, and pattern, substantially as before set forth.

7. I also claim the combination of the following instrumentalities, viz, the revolving polishing-wheel, holder for the article, shaft for the holder, springs to exert a yielding pressure, traversing-mechanism, and guide to limit the movement of the article towards the polishing-wheel, substantially as before set forth.

In testimony whereof, I have hereto set my hand, this twenty-eighth day of March, A. D. 1867.

ROBERT G. PINE.

Witnesses:
D. COOPER ALLINSON,
CARRIE FOSTER.